(12) United States Patent
Balaguru et al.

(10) Patent No.: US 11,859,091 B2
(45) Date of Patent: *Jan. 2, 2024

(54) PROTECTIVE COATINGS FOR FERROUS SUBSTRATES

(71) Applicant: Zirconia Inc., Tukwila, WA (US)

(72) Inventors: Balamuralee Venkatesalu Balaguru, Seattle, WA (US); Benjamin Theodore Cook, Seattle, WA (US)

(73) Assignee: Zirconia Inc., Tukwila, WA (US)

( * ) Notice: Subject to any disclaimer, the term of this patent is extended or adjusted under 35 U.S.C. 154(b) by 510 days.

This patent is subject to a terminal disclaimer.

(21) Appl. No.: 16/870,744

(22) Filed: May 8, 2020

(65) Prior Publication Data

US 2020/0354581 A1 Nov. 12, 2020

Related U.S. Application Data

(60) Provisional application No. 62/845,385, filed on May 9, 2019.

(51) Int. Cl.
| | |
|---|---|
| C09D 1/00 | (2006.01) |
| C09D 7/40 | (2018.01) |
| B05D 7/14 | (2006.01) |
| B05D 7/24 | (2006.01) |
| C23C 2/26 | (2006.01) |
| C09D 5/03 | (2006.01) |
| C09D 5/08 | (2006.01) |
| C23C 2/06 | (2006.01) |

(52) U.S. Cl.
CPC ............... *C09D 1/00* (2013.01); *B05D 7/14* (2013.01); *B05D 7/24* (2013.01); *C09D 5/031* (2013.01); *C09D 5/033* (2013.01); *C09D 5/08* (2013.01); *C09D 7/67* (2018.01); *C09D 7/70* (2018.01); *C23C 2/06* (2013.01); *C23C 2/26* (2013.01); *B05D 2202/10* (2013.01); *B05D 2401/20* (2013.01); *B05D 2401/32* (2013.01)

(58) Field of Classification Search
CPC .......... C09D 1/00; C09D 5/031; C09D 5/033; C09D 5/08; C09D 7/61; C09D 7/69; C09D 7/70; C09D 5/084; C09D 1/02; C09D 7/67; B05D 7/14; B05D 7/24; B05D 2401/32; C23C 2/26; C23C 28/00; C08K 3/22; C08K 7/02; C04B 2111/00482; C04B 2103/54; C04B 20/006; C04B 18/082; C04B 20/008; C04B 14/4631; C04B 14/4625; C04B 14/386; C04B 14/30; C04B 41/5041; C04B 41/5024; C04B 14/465; C04B 14/305

USPC ............... 428/446; 427/397.7; 106/635, 632, 106/287.17, 286.6, 286.4, 286.5, 286.1

See application file for complete search history.

(56) References Cited

U.S. PATENT DOCUMENTS

| | | | |
|---|---|---|---|
| 8,197,593 B2 | 6/2012 | Balaguru | |
| 2006/0234037 A1* | 10/2006 | Witsch | A47J 36/025 428/421 |
| 2015/0267060 A1* | 9/2015 | Mukhopadhyay | C08G 77/30 359/601 |
| 2016/0024310 A1* | 1/2016 | McMullin | C09D 7/62 523/400 |
| 2020/0354281 A1 | 11/2020 | Balaguru et al. | |
| 2020/0354580 A1 | 11/2020 | Balaguru et al. | |
| 2021/0214464 A1* | 7/2021 | Matsusue | C08L 1/02 |

FOREIGN PATENT DOCUMENTS

| | | | |
|---|---|---|---|
| CN | 105238105 A | * 1/2016 | |
| GB | 1595480 A | * 8/1981 | C09D 5/18 |
| KR | 20060102710 A | * 9/2006 | |

OTHER PUBLICATIONS

Machine translation of KR 20060102710 A, originally published Sep. 2006 to Jung et al. (Year: 2006).*
Machine translation of CN 105238105 A, originally published Jan. 2016 to Gao et al. (Year: 2016).*

* cited by examiner

*Primary Examiner* — Coris Fung
*Assistant Examiner* — Ritu S Shirali
(74) *Attorney, Agent, or Firm* — Alan G. Towner; Leech Tishman Fuscaldo & Lampl

(57) ABSTRACT

Inorganic coatings that may be used to coat and protect steel are disclosed. The protective inorganic coatings include a liquid composition portion comprising water, alkali metal oxide components and a silicate-containing component. The coatings also include a powder composition portion comprising microspheres, metal oxide powder and optional microfibers. When applied to steel substrates, the coatings provide chemical and physical protection.

32 Claims, No Drawings

PROTECTIVE COATINGS FOR FERROUS SUBSTRATES

CROSS-REFERENCE TO RELATED APPLICATION

This application claims the benefit of U.S. Provisional Patent Application Ser. No. 62/845,385 filed May 9, 2019, which is incorporated herein by reference.

FIELD OF THE INVENTION

The present invention provides protective coatings, and more particularly relates to protective inorganic coating compositions that may be applied to ferrous substrates including steel and other iron alloys.

BACKGROUND INFORMATION

Steel and iron substrates are highly susceptible to oxidation and corrosion. It would be desirable to provide protective coatings for steel and iron that reduce or prevent such corrosion.

SUMMARY OF THE INVENTION

The present invention provides coatings that protect against corrosion on ferrous substrates including steel and other iron alloys. The protective inorganic coatings include a liquid composition portion comprising water, alkali metal oxide components and a silicate-containing component. The coatings also include a powder composition portion comprising microspheres, metal oxide powder and optional microfibers.

An aspect of the present invention is to provide a protective inorganic coating composition comprising: a liquid composition portion comprising by weight percent of the liquid composition portion from 50 to 70 weight percent water, from 17 to 27 weight percent of an alkali metal oxide component comprising potassium oxide, and from 18 to 28 weight percent of a silicate-containing component; and a powder composition portion comprising by weight percent of the powder composition portion from 15 to 80 weight percent microspheres, from 2 to 70 weight percent of at least one metal oxide powder comprising a Group II metal, Group IV metal, Group VI metal, Group X metal, Group XII metal or a combination thereof, and up 50 weight percent microfibers.

Another aspect of the present invention is to provide a method of making a protective inorganic coating composition as described above. The method comprises adding the powder composition portion to the liquid composition portion, and mixing the powder composition portion and the liquid composition portion together.

A further aspect of the present invention is to provide a method of coating a steel substrate material by applying a protective inorganic coating as described above onto the substrate material.

Another aspect of the present invention is to provide a steel substrate coated with the protective inorganic coating described above.

These and other aspects of the present invention will be more apparent from the following description.

DETAILED DESCRIPTION

The present invention provides a protective coating composition for coating ferrous substrates comprising a liquid composition portion comprising by weight percent of the liquid composition portion: from 50 to 70 weight percent water, from 17 to 27 weight percent of an alkali metal oxide component comprising potassium oxide, and from 18 to 28 weight percent of a silicate-containing component; and a powder composition portion comprising by weight percent of the powder composition portion: from 15 to 80 weight percent of microspheres, from 2 to 70 weight percent of at least one metal oxide powder comprising a Group II metal, Group IV metal, Group VI metal, Group X metal, Group XII metal or a combination thereof, and up to 50 weight percent microfibers. In certain embodiments, the liquid composition portion comprises from 52 to 65 weight percent water, from 20 to 24 weight percent alkali metal oxide component, and from 21 to 25 weight percent silicate-containing component, and the powder composition portion comprises from 20 to 60 weight percent microspheres, from 3 to 50 weight percent metal oxide powder, and from 1 to 40 weight percent microfibers. For example, the powder composition portion comprises from 30 to 50 weight percent microspheres, and from 4 to 20 weight percent metal oxide powder, and from 2 or 5 to 20 or 30 weight percent microfibers.

The liquid composition portion may comprise from 10 to 55 weight percent of the total weight of the coating composition, and the powder composition portion may comprise from 45 to 90 weight percent of the total weight of the coating composition. In certain embodiments, the liquid composition portion may comprise from 15 to 50 weight percent of the total weight of the coating composition, and the powder composition portion may comprise from 50 to 85 weight percent of the total weight of the coating composition. For example, the liquid composition portion may comprise from 20 to 45 weight percent of the total weight of the coating composition, and the powder composition portion may comprise from 55 to 80 weight percent of the total weight of the coating composition.

The silicate-containing component may comprise potassium silicate, and may be provided in the form of a water-based solution containing the potassium silicate.

The microspheres may have a particle size from about 0.05 to about 10 μm, and may comprise at least one material selected from cenospheres, glass, pozzolan, ceramic, and composite.

The Group II metal oxide may be selected from the group consisting of calcium, beryllium, and magnesium. The Group IV metal oxides may be selected from the group consisting of titanium, zirconium, and hafnium. The Group VI metal oxides may be selected from the group consisting of chromium, molybdenum, and tungsten. The Group XI metal oxide may be zinc and cadmium. Each of the Groups II, IV, VI, XII metal oxides may have a maximum particle size of about 10 μm.

The coating compositions may also include microfibers such as silica, alumina, carbon, wollastonite, silicon carbide or a combination thereof. The microfibers may have an average aspect ratio of greater than 2:1, a maximum length of 500 μm, and a maximum diameter of 50 μm. For example, the microfibers may have an average aspect ratio of from 2:1 to 5:1 or 10:1, an average length of from 10 to 200 microns, and an average diameter of from 0.1 to 10 microns. The microfibers may comprise from 1 to 30 weight percent of the powder composition portion, for example, from 2 to 20 or from 5 to 10 weight percent of the powder composition portion.

The coating composition may further comprise alumina powder in the 5 nanometers to 5 μm size in an amount up to 5 or 10 weight percent of the powder composition portion.

The coating composition may further comprise a sugar in an amount of from about 0.1 to about 1.5 or 2 weight percent of the total composition.

The compositions may further comprise a densifier such as silicic acid in an amount up to 10 weight percent of the total composition, for example, from 0.5 to 5 weight percent, or from 1 to 3 weight percent.

The coating composition may further comprise standard colored pigments, for example, in an amount of from 0.1 to 10 weight percent of the coating composition.

The coating composition may further comprise nano-diameter tubes composed of carbon, graphene, alumina, silica, or nitrides. Such nanotubes may be functionalized and may have a maximum length of 50 μm and a maximum diameter of 500 nanometers.

The coating compositions may further comprise at least one additional component selected from carbides, nitrides, borides, silicides, zeolites, or a combination thereof. Such additional components may have a maximum particle size of 25 μm and may be provided in the form of elongated single crystal whiskers.

The compositions may further comprise metakaolin in an amount of from 0.1 to 10 weight percent, or from 1 to 5 weight percent, based on the weight of the powder composition portion.

In accordance with an embodiment of the present invention, a method for coating a substrate is provided, comprising applying the coating compositions described above onto a steel substrate and allowing the composition to cure or dry. The coating compositions may be applied by any suitable method such as spraying, painting, or dip coating the substrate with this composition.

As used herein the terms "steel" and "steel substrate" include iron, steel and alloys thereof. The present coatings reduce corrosion, can provide abrasion resistance, and can electrically insulate such ferrous substrates.

The present coatings may passivate steel in several ways: form a glass barrier layer that stops any humidity, salts, or contaminants from ever reaching the surface; attach iron atoms to molecules of silica glass, passivating them by bonding iron atoms chemically, e.g., covalently, so that the iron atoms do not form iron oxide; form a permanent alkali protective layer that passivates steel; penetrate and neutralize corrosion cells and passivate iron oxide; insulate against stray currents; provide a biologically impervious surface that inhibits bacteria which causes microbially induced corrosion (MIC).

The present coatings reduce or eliminate the main cause of coating failure, rust creep, giving the top coating an extended lifespan. The present coatings can be considered to be a non-sacrificial primer. The coatings may form an integral composite with steel surfaces that cannot be separated. The coatings thermally expand and contract with the steel, and will not delaminate, crack or peel. The addition of fibers and nano-ceramic barrier particles adds flexibility and abrasion resistance.

The present coatings may be applied over clean, degreased steel surfaces. Smooth surfaces may be lightly abraded and loose rust may be removed to provide a proper surface for attachment. The present coatings can be applied by any suitable method, such as spraying, and room temperature cured.

The coatings may include ceramics particles, such as silica carbide for increased abrasion resistance, to imbue the coating with certain properties tailored for its end use. This makes the coatings extremely useful for industry and infrastructure.

The present coatings may lower toxicity to workers and the environment.

The following examples are intended to illustrate various aspects of the present invention, and are not intended to limit the scope of the invention.

Example 1

A coating composition comprising three components is prepared: liquid, powder, and densifier. The liquid is made by blending a silicate-containing solution and potassium hydroxide flakes in water to create a binder solution. The powder is made by mixing the various raw components listed above. Pozzolan microspheres represent 45-50% of the powder, by weight. Metakaolin represents 1-5% of the powder, by weight. Titanium, zirconium, hafnium, iron, and aluminum oxides represent 25-40% of the powder, by weight. Microfiber composed of wollastonite represents 5-10% of the powder, by weight. Zinc oxide represents 5-10% of the powder, by weight. Discrete carbon fibers represent 5-10% of the powder, by weight. Densifier consisting of silicic acid is added to the liquid and powder at 1-5%, by weight.

Example 2

A coating consisting of the components of Example 1 is prepared, 0.1-10% silicon carbide in the form of whiskers added, by weight.

Example 3

A coating consisting of the components of Example 1 is prepared by mixing the liquid, powder, and densifier components in either a high or low shear mixer (such as a paint mixing drill bit) to form a low-viscosity solution that can be applied to the surface of concrete. The coating composition is applied to steel surfaces either by brush, roller, sprayer, or any other method typically used to apply coatings.

Example 4

A coating consisting of the components of Example 1 is applied to steel and allowed to dry, harden, and cure at room temperature on the steel surface.

Example 5

A coating consisting of the components of Example 1 is applied to low-carbon steel. This prevents oxidation from occurring, chemically stabilizes and neutralizes any surface contaminants, prevents abrasion of the steel surface, and creates a primer surface for a topcoat.

Example 6

A coating consisting of the components of Example 1 is applied to high-carbon steel. This prevents oxidation from occurring, chemically stabilizes and neutralizes any surface contaminants, prevents abrasion of the steel surface, and creates a primer surface for a topcoat.

Example 7

A coating consisting of the components of Example 1 is submerged in water. The coating prevents the surface from oxidizing/rusting.

Example 8

A coating consisting of the components of Example 1 is submerged in saltwater. The coating prevents the surface from oxidizing/rusting.

Example 9

Physical testing results for coated steel substrates are listed in Table I below. The coating composition included three components: liquid, powder, and densifier. The liquid portion is blend of a silicate-containing water-based solution 70% by weight, potassium hydroxide flakes 10% by weight, and water 20% by weight. The silicate-containing solution comprises about 61 weight percent water and about 39 weight percent potassium silicate and a combination of silicic acid and potassium salt, and is commercially available under the designation KASIL 6 Potassium Silicate Solution from PQ Corporation. The water contained in the silicate-containing solution and the separately added water provide a total water content of about 58 weight percent of the liquid portion. The powder portion is made by mixing pozzolan microspheres 48% by weight, metakaolin 3% by weight, zirconium oxide 24% by weight, zinc oxide 7% by weight, aluminum oxide 2% by weight, microfiber wollastonite 7% by weight, discrete carbon fibers 9% by weight. The densifier is silicic acid 100% by weight. The final composition comprises 33% by weight of the liquid portion, 65% by weight of the powder portion, and 2% by weight of the silicic acid densifier.

TABLE 1

PHYSICAL TESTING

| | |
|---|---|
| Dry Film Thickness | 4-8 Mils (100-200 Microns) |
| Direct Pull-Off Adhesion (ASTM D4541) | >1500 PSI on Steel & Iron |
| Adhesion by Knife (ASTM D6677) | Rating: 10/10 |
| Thermal Expansion | Steel & Iron Compatible |
| Immersion in Water (ASTM D870) | 1000 Hours (No Corrosion) |
| Immersion in Saltwater (ASTM D870) | 1000 Hours (No Corrosion) |
| Saltwater "Corrosion Creep" (ASTM D1654)* *performed by Pacific Northwest National Laboratory | 0 millimeters |
| Hardness, Shore D (ASTM D2240) | 85.0 ± 5.0 |
| UVA/B 370 nmλ | No Chalking Occurred No Cracking Occurred No Delamination Occurred |
| Fire Rating (ASTM E84 - 15b) | Zero (0) Flame Spread |
| Smoke Generation (ASTM E84 - 15b) | Zero (0) Smoke |

For purposes of the detailed description, it is to be understood that the invention may assume various alternative variations and step sequences, except where expressly specified to the contrary. Moreover, other than in any operating examples, or where otherwise indicated, all numbers such as those expressing values, amounts, percentages, ranges, subranges and fractions may be read as if prefaced by the word "about," even if the term does not expressly appear. Accordingly, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Where a closed or open-ended numerical range is described herein, all numbers, values, amounts, percentages, subranges and fractions within or encompassed by the numerical range are to be considered as being specifically included in and belonging to the original disclosure of this application as if these numbers, values, amounts, percentages, subranges and fractions had been explicitly written out in their entirety.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

As used herein, "including," "containing" and like terms are understood in the context of this application to be synonymous with "comprising" and are therefore open-ended and do not exclude the presence of additional undescribed or unrecited elements, materials, ingredients or method steps. As used herein, "consisting of" is understood in the context of this application to exclude the presence of any unspecified element, ingredient or method step. As used herein, "consisting essentially of" is understood in the context of this application to include the specified elements, materials, ingredients or method steps "and those that do not materially affect the basic and novel characteristic(s)" of what is being described.

As used herein, the terms "on," "onto," "applied on," "applied onto," "formed on," "deposited on," "deposited onto," mean formed, overlaid, deposited, or provided on but not necessarily in contact with the surface. For example, a coating composition "deposited onto" a substrate does not preclude the presence of one or more other intervening coating layers of the same or different composition located between the coating composition and the substrate.

Whereas particular embodiments of this invention have been described above for purposes of illustration, it will be evident to those skilled in the art that numerous variations of the details of the present invention may be made without departing from the invention as defined in the appended claims.

What is claimed is:
1. A protective inorganic coating composition comprising:
   a liquid composition portion comprising by weight percent of the liquid composition portion: from 50 to 70 weight percent water, from 17 to 27 weight percent of an alkali metal oxide component comprising potassium oxide, and from 18 to 28 weight percent of a silicate-containing component;
   a powder composition portion comprising by weight percent of the powder composition portion: from 15 to 80 weight percent microspheres, from 2 to 70 weight percent of at least one metal oxide powder comprising a Group II metal, Group IV metal, Group VI metal, Group X metal, Group XII metal or a combination thereof, and up 50 weight percent microfibers; and
   from 0.5 to 10 weight percent of a densifier comprising silicic acid based on the total weight of the coating composition.
2. The protective inorganic coating composition of claim 1, wherein the water comprises from 52 to 65 weight percent, the alkali metal oxide component comprises from 20 to 24 weight percent, and the silicate-containing component comprises from 21 to 25 weight percent.

3. The protective inorganic coating composition of claim 1, wherein the microspheres comprise from 20 to 60 weight percent, and the at least one metal oxide powder comprises from 3 to 50 weight percent.

4. The protective inorganic coating composition of claim 1, wherein the microspheres comprise from 30 to 50 weight percent, and the at least one metal oxide powder comprises from 4 to 20 weight percent.

5. The protective inorganic coating composition of claim 1, wherein the liquid composition portion comprises from 15 to 60 weight percent of the total weight of the coating composition, and the powder composition portion comprises from 40 to 85 weight percent of the total weight of the coating composition.

6. The protective inorganic coating composition of claim 1, wherein the liquid composition portion comprises from 20 to 50 weight percent of the total weight of the coating composition, and the powder composition portion comprises from 50 to 80 weight percent of the total weight of the coating composition.

7. The protective inorganic coating composition of claim 1, wherein the liquid composition portion comprises from 25 to 40 weight percent of the total weight of the coating composition, and the powder composition portion comprises from 60 to 75 weight percent of the total weight of the coating composition.

8. The protective inorganic coating composition of claim 1, wherein the microspheres have an average particle size of from 0.05 to 25 microns.

9. The protective inorganic coating composition of claim 1, wherein the microspheres comprise at least one material selected from cenospheres, glass, pozzolan, ceramic, and composite.

10. The protective inorganic coating composition of claim 1, wherein the microspheres comprise cenospheres, ceramic, pozzolan or a combination thereof.

11. The protective inorganic coating composition of claim 1, wherein the at least one metal oxide powder has a maximum particle size of 10 microns.

12. The protective inorganic coating composition of claim 1, wherein the at least one metal oxide powder has an average particle size of from 0.05 to 5 microns.

13. The protective inorganic coating composition of claim 1, wherein the Group II metal oxide is selected from calcium, beryllium and magnesium oxides, the Group IV metal oxide is selected from titanium, zirconium and hafnium oxides, the Group VI metal oxide is selected from chromium molybdenum and tungsten oxides, and the Group XII metal oxide is selected from zinc and cadmium oxides.

14. The protective inorganic coating composition of claim 1, wherein the microfibers comprise from 1 to 40 weight percent of the powder composition portion and have an average aspect ratio of at least 2:1, a maximum length of 500 microns, and a maximum diameter of 50 microns.

15. The protective inorganic coating composition of claim 14, wherein the microfibers have an average aspect ratio of from 2:1 to 5:1, an average length of from 10 to 200 microns, and an average diameter of from 0.1 to 10 microns.

16. The protective inorganic coating composition of claim 14, wherein the microfibers comprise from 2 to 30 weight percent of the powder composition portion.

17. The protective inorganic coating composition of claim 14, wherein the microfibers comprise from 5 to 20 weight percent of the powder composition portion.

18. The protective inorganic coating composition of claim 1, wherein the microfibers comprise wollastonite, silica, alumina, carbon, silicon carbide, or a combination thereof.

19. The protective inorganic coating composition of claim 1, wherein the microfibers comprise wollastonite, carbon or a combination thereof.

20. The protective inorganic coating composition of claim 1, wherein the powder composition portion further comprises metakaolin.

21. The protective inorganic coating composition of claim 1, wherein the powder composition portion comprises alumina powder having an average particle size of from 5 nanometers to 5 microns.

22. The protective inorganic coating composition of claim 1, wherein the powder composition portion further comprises at least one component selected from carbides, nitrides, borides, silicides, zeolites or a combination thereof having a maximum particle size of 25 microns.

23. The protective inorganic coating composition of claim 1, wherein the powder composition portion further comprises elongated single crystal whiskers.

24. The protective inorganic coating composition of claim 1, wherein the powder composition portion further comprises sugar in an amount of from 0.1 to 2 weight percent based on the total weight of the coating composition.

25. The protective inorganic coating composition of claim 1, wherein the coating composition comprises from 1 to 5 weight percent of the densifier based on the total weight of the coating composition.

26. The protective inorganic coating composition of claim 1, wherein the coating composition further comprises a pigment in an amount of from 0.1 to 10 weight percent based on the total weight of the coating composition.

27. The protective inorganic coating composition of claim 1, wherein the coating composition further comprises nano-diameter tubes having a maximum length of 50 microns and a maximum diameter of 500 nanometers, and the nano-diameter tubes comprise carbon, graphene, alumina, silica, nitrides, or a combination thereof.

28. A method of making a protective inorganic coating composition as recited in claim 1, the method comprising adding the powder composition portion of claim 1 to the liquid composition portion of claim 1, mixing the powder composition portion and the liquid composition portion, and adding the densifier to the mixed powder composition portion and liquid composition portion to produce the protective inorganic coating composition of claim 1.

29. A method of coating a substrate material by applying a protective inorganic coating composition of claim 1 onto the substrate material.

30. The method of claim 29, wherein the substrate material comprises steel.

31. A substrate coated with the protective inorganic coating of claim 1.

32. The coated substrate of claim 31, wherein the substrate comprises steel.

* * * * *